(12) United States Patent
Yoshimoto et al.

(10) Patent No.: US 7,715,401 B2
(45) Date of Patent: May 11, 2010

(54) ROUTER

(75) Inventors: Tetsuro Yoshimoto, Kokubunji (JP); Hidenori Inouchi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 12/031,856

(22) Filed: Feb. 15, 2008

(65) Prior Publication Data

US 2008/0298370 A1    Dec. 4, 2008

(30) Foreign Application Priority Data

May 31, 2007    (JP)    ............................. 2007-144431

(51) Int. Cl.
    *H04L 12/56*    (2006.01)
(52) U.S. Cl. .................. 370/392; 370/395.21
(58) Field of Classification Search ........................ None
    See application file for complete search history.

(56) References Cited

U.S. PATENT DOCUMENTS

2007/0230339 A1*  10/2007  Chen et al. .................. 370/230
2008/0228932 A1*  9/2008   Monette et al. .............. 709/229
2009/0147792 A1*  6/2009   Anschutz et al. ........ 370/395.21

OTHER PUBLICATIONS

3GPP2 X.S0013-012-0.
3GPP2 X.P0013-013-0.
3GPP2 X.P0013-014-0.

\* cited by examiner

*Primary Examiner*—Chirag G Shah
*Assistant Examiner*—Amarnauth Persaud
(74) *Attorney, Agent, or Firm*—Mattingly & Malur, P.C.

(57) ABSTRACT

Even when session control traffic such as SIP traffic to be unitarily subjected to QoS management by a manager of a session control network such as an SIP network, and loop-back traffic to be freely subjected to QoS management by users coexist, QoS processing can be appropriately performed. The edge router checks a routing table and the address information of an SIP message to derive an SIP stream direction. The edge router timely selects a table that can be set by only SIP network managers, and a table that can be set by user network managers as well, determines QoS setting information by collating other SIP/SDP message information, and sets it in a QoS function unit.

10 Claims, 10 Drawing Sheets

FIG. 8

| direction | media | attribute | ACTION TO QoS/FILTERING FUNCTION UNIT |
|---|---|---|---|
| * | audio *RTP/AVP* | sendrecv | MARK PACKET HAVING SENDER ADDRESS S, DESTINATION ADDRESS D, AND USE PORT P BY EF, AND SHAPE IN BAND B |
| outbound | video *RTP/AVP* | recvonly | MARK PACKET HAVING SENDER ADDRESS S, DESTINATION ADDRESS D, AND USE PORT P BY AF43, AND SHAPE IN BAND B |
| | .. | .. | .. |
| * | **** | * | MARK PACKET HAVING SENDER ADDRESS S, DESTINATION ADDRESS D, AND USE PORT P BY BE, AND POLISH IN BAND B |

S: SENDER ADDRESS
D: DESTINATION ADDRESS
P: USE PORT
B: BAND

FIG. 9

| direction | media | attribute | ACTION TO QoS/FILTERING FUNCTION UNIT |
|---|---|---|---|
| inbound (LAN) | audio *RTP/AVP* | sendrecv | MARK PACKET HAVING SENDER ADDRESS S, DESTINATION ADDRESS D, AND USE PORT P BY EF, AND SHAPE IN BAND B — 10241 |
| inbound (LAN) | video *RTP/AVP* | sendonly | MARK PACKET HAVING SENDER ADDRESS S, DESTINATION ADDRESS D, AND USE PORT P BY AF43, AND SHAPE IN BAND B — 10242 |
| .. | .. | .. | .. |
| inbound (LAN) | **** | * | MARK PACKET HAVING SENDER ADDRESS S, DESTINATION ADDRESS D, AND USE PORT P BY BE, AND POLISH IN BAND B — 10243 |

1024

S: SENDER ADDRESS
D: DESTINATION ADDRESS
P: USE PORT
B: BAND

FIG. 10

```
SIP/2.0 200 OK                    D
Via: SIP/2.0/UDP 3.1.1.100;branch=~
From: <sip:0123456789@example.com>;tag=~
To: <sip:0987654321@example.com>;tag=~
              :

v=0
o=0123456789 ~ ~ IN IP4 2.1.1.100
s=-                    S
c=IN IP4 2.1.1.100
t=0 0           P
m=audio 5002 RTP/AVP 0
a=rtpmap:0 PCMU/8000
a=sendrecv
b=AS:64       D
```

S: SENDER ADDRESS
D: DESTINATION ADDRESS
P: USE PORT
B: BAND

ROUTER

CLAIM OF PRIORITY

The present application claims priority from Japanese application JP 2007-144431 filed on May 31, 2007, the content of which is hereby incorporated by reference into this application.

FIELD OF THE INVENTION

The present invention relates to a router.

BACKGROUND OF THE INVENTION

To realize QoS (Quality of Service) in traffic of an SIP (Session Initiation Protocol) application, for example, the following is performed:

(1) Appropriate ToS/DSCP (Type of Service/Differentiated Service Code Point) marking is performed for packets distributed over a session.

(2) Shaping of traffic is performed.

(3) Traffic for which SIP signaling is not completed is subjected to filtering to secure a band, and other control is performed. As QoS information, only band is defined in a band field (b=) of session description protocol (SDP, Session Description Protocol). A system of communicating other QoS information such as marking and shaping directly in SDP is discussed in MMUSIC of IETF (Internet Engineering Task Force) and the like. However, a general method is to assign a value set by an SIP network manager to an SIP application terminal, based on the values of the SDP media field (m=) and the attribute field (a=).

However, there are SIP application terminals in which QoS parameters set by an SIP network manager cannot be set. When terminals in which QoS parameters can be set are not under control of an SIP network manager, terminal users may set different values from those set by an SIP network manager in their own judgment.

Since use of these terminals inhibits proper operation of priority control of SIP applications, QoS control must be performed in network edges.

For example, in the third generation portable network shown in a reference document: X.P0013-012 to X. P0013-014 (3GPP2), since cellular phones as terminals cannot set QoS parameters, QoS setting is performed in PDSN (Packet Data Serving Node) being a network edge.

SUMMARY OF THE INVENTION

However, for example, in a cable network, it is conceivable to use devices such as home gateway devices placed in home as network edges that can be managed to some extent by network managers and users. In this case, in an application that performs traffic loopback in home gateways such as extension telephones, it is not proper for SIP network service providers to manage QoS setting concerning loopback traffic. However, if user network managers also can set QoS setting information, since QoS within an SIP network becomes inoperative, it is necessary to separate QoS setting information.

The present invention has been made in view of the above circumstances, and its object is to approximately perform QoS processing even when session control traffic such as SIP traffic to be unitarily subjected to QoS management by managers of session control networks such as SIP networks, and loopback traffic to be freely subjected to QoS management by users coexist.

In the present invention, for example, an edge router is provided with SIP proxy functions to make it an outbound SIP proxy through which SIP signaling and SIP traffic outside an SIP network never fail to pass. Two tables are provided to associate SIP messages with QoS setting information; one can be set by only SIP network managers, and the other can be set by user network managers as well. The SIP proxy functions on the edge router check a routing table and the address information of SIP message to derive an SIP stream direction. When the derived SIP stream direction passes within the SIP network, by checking a table that can be set by only SIP network managers against other SIP/SDP message information, QoS setting information can be determined and set in a QoS function unit. When the derived SIP stream direction is loopback between user networks, by checking a table that can be set by user network managers as well against other SIP/SDP message information, QoS setting information can be determined and set in the QoS function unit.

A solution means of the present invention is a router that includes a session control proxy function and a function to perform QoS processing for packets, and performs communication between a user network including a terminal and a session control service provider network. The router includes: a first QoS setting content description table that can be set by a service provider that provides session control services, and stores the setting contents of QoS processing, correspondent to a communication direction and the stream attribute of a session control message; a second QoS setting content description table that can be set by a service provider that provides session control services and a user network manager, and stores the setting contents of QoS processing, correspondent to a communication direction and the stream attribute of a session control message; a QoS/filtering function unit that performs QoS processing, based on the setting content of the QoS processing; and a processing unit that analyzes a session control message in the session control proxy function, refers to the first and the second QoS setting content description tables, and determines the setting content of QoS processing of the QoS/filtering function unit. The processing unit extracts communication information containing a destination address and a sender address, and stream attributes from a received response message from a destination terminal. The processing unit determines a communication direction according to a combination of whether a destination is in a user network side or session service provider side, and whether a sender is in the user network side or the session service provider side, based on the extracted destination address and the sender address. The processing unit, when the communication direction of the session control message passes through the session control service provider network, refers to the first QoS setting content description table. On the other hand, when the communication direction of the session control message is loopback from the user network side to the user network side, the processing unit refers to the second QoS setting content description table, searches the setting content of QoS processing, based on the communication direction and the stream attribute, and sets the setting content in the QoS/filtering processing unit, based on the session control message containing the destination address and the sender address.

According to the present invention, even when session control traffic such as SIP traffic to be unitarily subjected to QoS management by a manager of a session control network such as an SIP network, and loopback traffic to be freely subjected to QoS management by users coexist, QoS processing can be appropriately performed.

BRIEF DESCRIPTION OF THE DRAWINGS

FIG. 8 illustrates an example of an SIP message-QoS/filtering setting action correspondence table of service provider side;

FIG. 9 illustrates an example of an SIP message-QoS/filtering setting action correspondence table of user side; and FIG. 10 illustrates an example of a 200 OK message that passes through an SIP network.

DETAILED DESCRIPTION OF THE PREFERRED EMBODIMENTS

Although in the embodiments below, embodiments concerning SIP are described as one example, the present invention is not limited to the embodiments, and can apply to different types of session control.

1. Hardware

Figure 6:
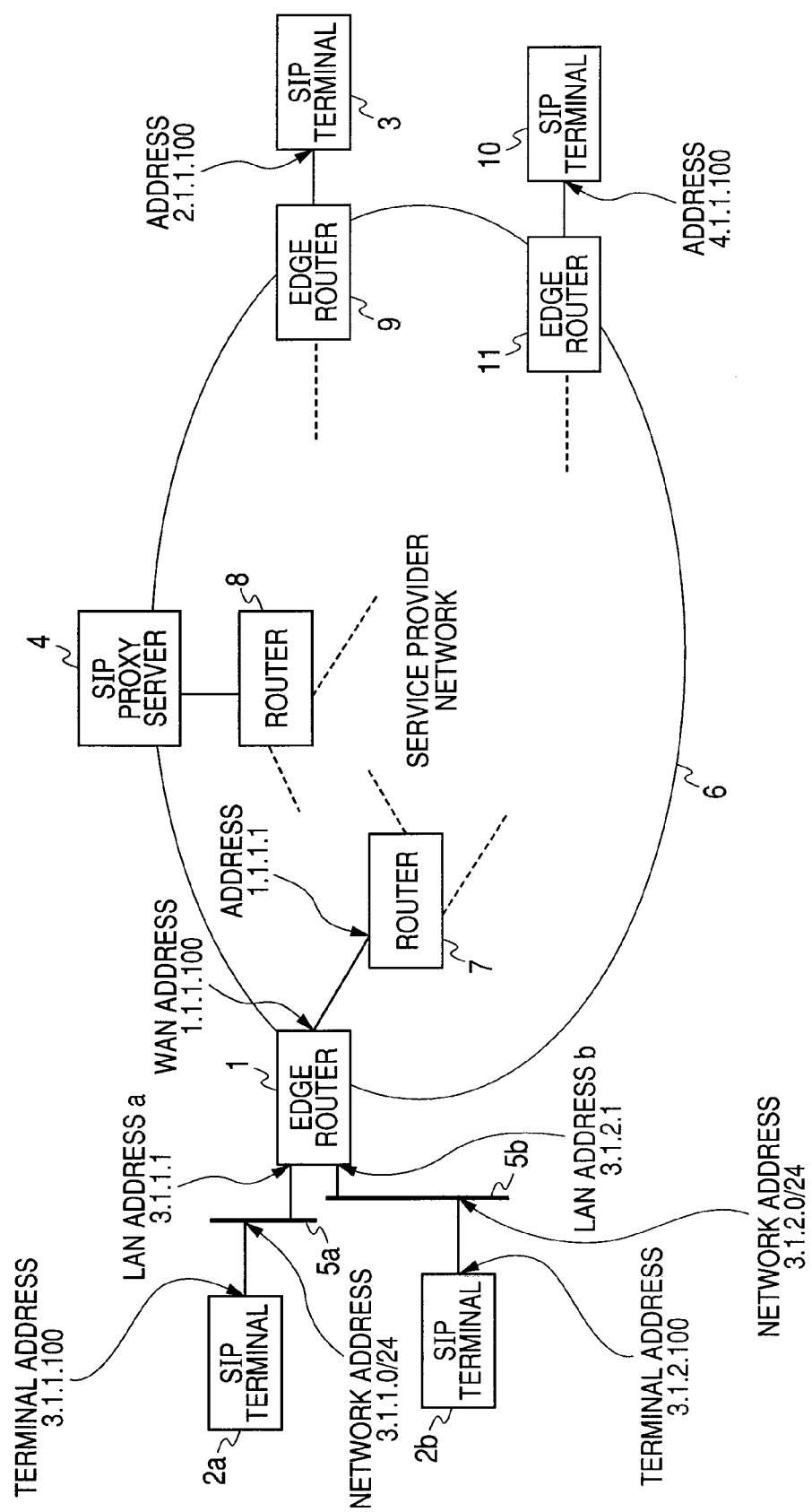
FIG. 6 is a drawing showing an example of a network to which this embodiment is applied.

FIG. 6 is a drawing of a typical network to which this embodiment is applied.

To a service provider network 6 that provides SIP services, an edge router 1 of an embodiment of the present invention, an SIP proxy server 4 that provides SIP services, and routers 7, 8, and 9 that constitute the network are connected. The above devices are ones that can be directly managed by the service provider that provides SIP services. On the other hand, user networks 5a and 5b are connected via an edge router 1, and SIP terminals 2a and 2b are connected via the user networks 5a and 5b, respectively. The edge router 1 defaults to the router 7, and IP packets arriving in the edge router 1, except those directed to LAN, are transmitted to the router 7. SIP terminals 3 and 10 not under control of the edge router 1 are connected with the edge routers 9 and 11. The terminal addresses of SIP terminals 2a, 2b, 3, and 10, the LAN addresses a and b, and WAN address of the edge router 1, the address of the router 7, the network address of LAN are shown in the drawing. In the drawing, for example, the edge router 1 and its right side correspond to WAN, and the edge router 1 and its left side correspond to LAN.

Figure 7:
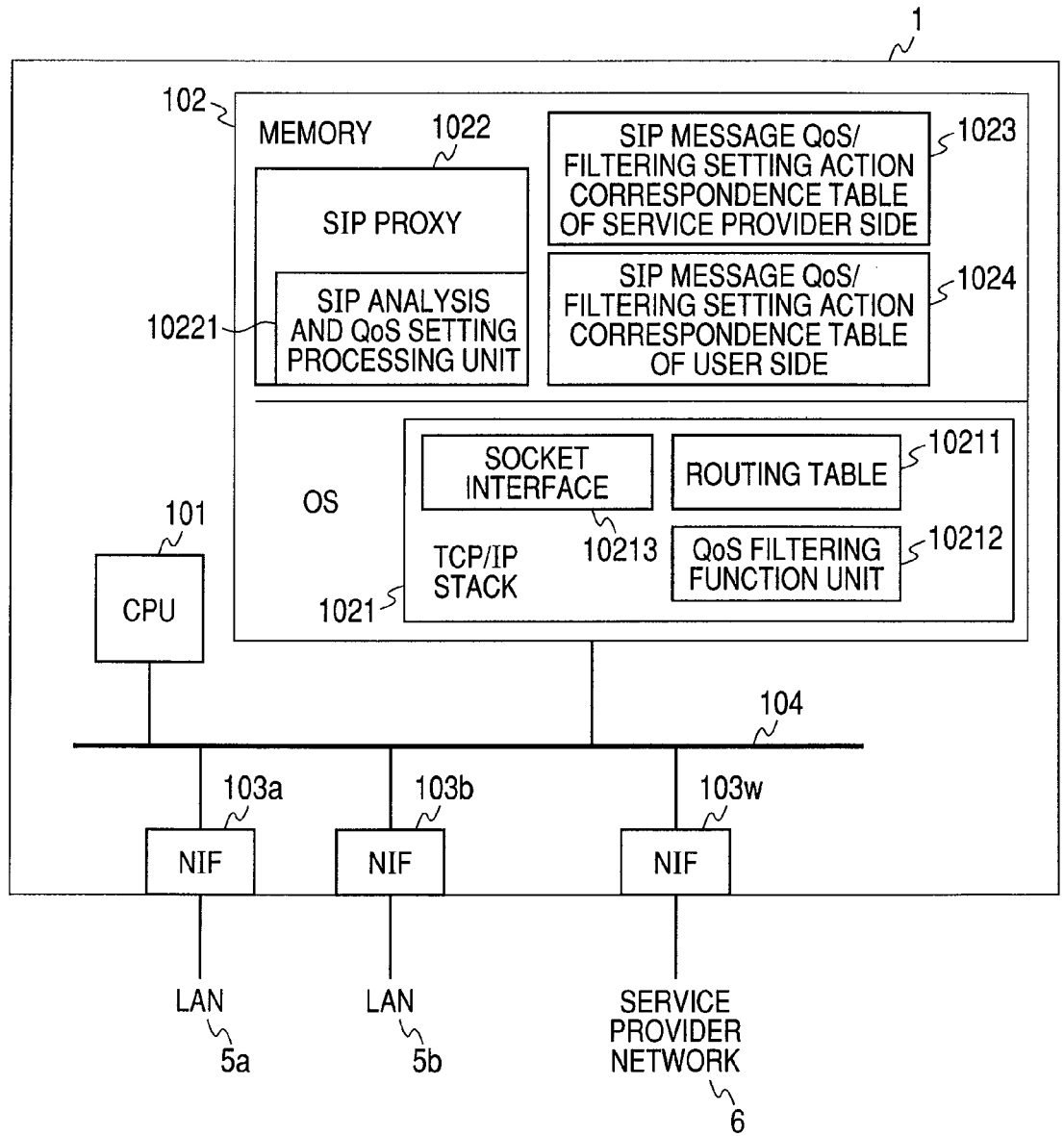
FIG. 7 is a device configuration drawing of an edge router.

FIG. 7 is a device block diagram of the edge router 1.

The edge router 1 is a common router system in which, for example, a CPU 101, memory 102, and NIF 103a, NIF 103b, NIF 103w are connected through a bus 104. The memory includes a TCP/IP stack in which a routing table 10211 for normal packet transfer, and QoS/filtering function unit 10212 that performs packet marking, shaping/polishing, and filtering exist. Furthermore, a socket interface 10213 for providing TCP/IP communication functions to applications exists. This is an interface that abstracts IP address, port number, protocol, and the like, thereby enabling applications to perform processing with only payload within packets in mind. If necessary, the address and port number of a sender can be taken out additionally. As an application on the OS, there is an SIP proxy software processing unit (SIP proxy) 1022, which includes an SIP analysis and QoS setting processing unit 10221. Furthermore, there are correspondence tables 1023 and 1024 for deciding the contents of settings to the QoS/filtering function unit from the contents of an SIP message. The correspondence table 1023 can be set by only service providers that provide SIP services, and the correspondence table 1024 can be set not only by service providers that provide SIP services, but also by user network managers. This time, TCP/IP stack for packet transfer is implemented by software. However, it may be implemented by hardware and connected through the bus 104.

FIG. 8 is an example of an SIP message-QoS/filtering setting action correspondence table 1023 of the service provider side.

The correspondence table 1023 stores setting actions of QoS processing, corresponding to communication directions and stream attributes (media, attribute) SIP 200 OK messages. The asterisk (*) indicates that the field is optional.

For example, the first line 10231 of the table supposes a bidirectional audio application such as VoIP. When the edge router 1 receives, regardless of the caller of a message (regardless of direction), an SIP 200 OK message, the SIP proxy 1022 (SIP analysis/QoS setting processing unit 10221) performs the setting of "marking a packet having a sender address S, destination address D, and use port P by EF (Expedited Forwarding of the highest priority) and shaping in a band B" in the QoS/filtering function part 10212, wherein the SIP 200 OK message has the media column having a media element of audio and a proto element of RTP/AVP (Realtime Transport Protocol/Audio Video Profile) and attribute of sendrecv (bidirectional). The sender address S, destination address D, use port P, and band B are setting parameters extracted from an SDP unit of the SIP 200 OK message. The second line 10232 of the table supposes a unidirectional image application such as VoD. When the caller of a message is a user network (direction=outbound), and the edge router 1 receives the message having the media column having a media element of video and a proto element of RTP/AVP and attribute of recvonly (only receive), the SIP proxy 1022 (SIP analysis/QoS setting processing unit 10221) performs the setting of "marking a packet having a sender address S, destination address D, and use port P by AF43 (Assured Forwarding of high priority) and shaping in a band B" in the QoS/filtering function part 10212. The last line 10233 of the table means the setting to the QoS/filtering function part 10212 when an SIP 200 OK message received by the edge router 1 does not meet any of conditions set previously, and the SIP proxy 1022 (SIP analysis/QoS setting processing unit 10221) sets traffic of the lowest priority of "marking a packet having a sender address S, destination address D, and use port P by BE (Best Effort) and polishing in a band B."

FIG. 9 is an example of an SIP message-QoS/filtering setting action correspondence table 1024 of the user side.

The contents of the correspondence table 1024 are the same as the above-described correspondence table 1023, except that direction is limited to inbound (LAN).

FIG. 10 is part of an example of a 200 OK message. Elements not directly related this embodiment are omitted as required.

The destination address D described above is extracted from the last line of Via: line existing in the SIP header unit of the SIP 200 OK message. The sender address S is extracted from a connection line (c=line) of the SDP unit of the SIP 200

OK message. The use port number P is extracted from elements of the second element of the media line (m=line) of the SDP unit. The band B is extracted from the bandwidth line (b=line) of the SDP unit.

2. Sequence of QoS Setting and Processing

Figure 1:
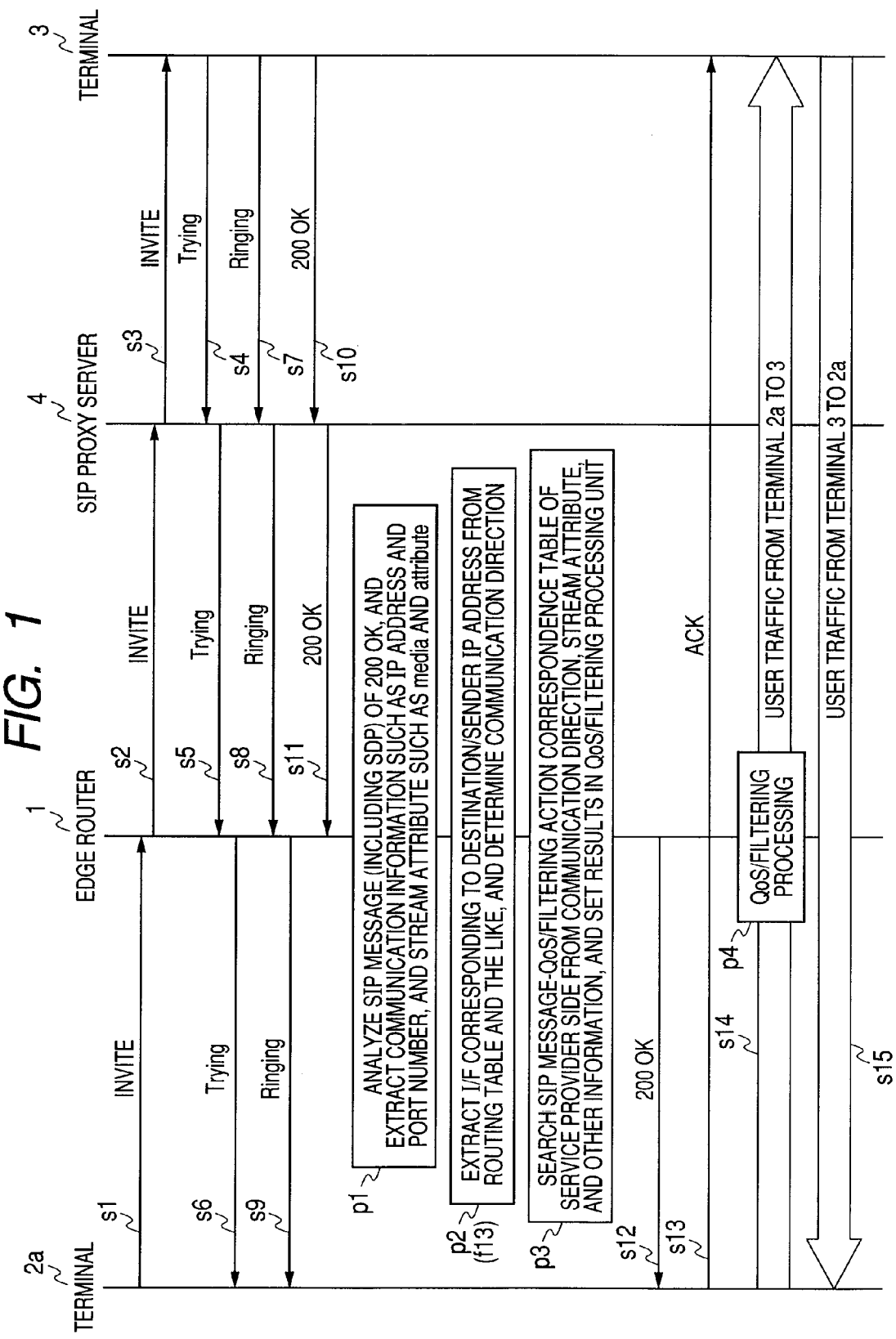
FIG. 1 is a sequence diagram of this embodiment (a call issued from a terminal 2a passes through an SIP network)

FIG. 1 is a sequence diagram when a call issued from a terminal 2a to which this embodiment is applied passes through an SIP network.

An SIP INVITE message issued from the terminal 2a is temporarily put into proxy in the edge router 1 (s1) before being transferred to an SIP proxy server 4, which provides actual services (s2). The server 4 transfers an INVITE message to a terminal 3 being a transmission party (s3). The terminal 3 transmits an SIP Trying message, then an SIP Ringing message to the terminal 2. The two messages arrive in the terminal 2 through a route reverse to INVITE (s4, s5, s6, s7, s8, s9). On completion of a preparation to receive INVITE from the terminal 2a, the terminal 3 transmits a 200 OK message (s10). The 200 OK message arrives in the edge router 1 via the server 4 (s11). On receiving the 200 OK message, the edge router 1 analyzes an SIP message (including SDP) of 200 OK, and extracts communications information such as destination/sender IP address, use port number, and protocol, and stream attributes such as band, media, and attribute (p1). The edge router 1 checks the extracted destination/sender IP address and the routing table and the like to extract a corresponding interface, and determines a communication direction, based on it (p2). Since the communication direction is a direction that passes through the SIP network (outbound direction with sender of WAN and destination of LAN: described later in f13), the edge router 1 searches the SIP message-QoS/filtering action correspondence table 1023 of service provider side from the stream attributes and other information, and sets results in the QoS/filtering processing unit (p3). Processing for determining a communication direction and the selection of a correspondence table to be used will be detailed in "3. QoS Setting Flowchart." After that, the edge router 1 transmits a 200 OK message to the terminal 2 (s12). The terminal 2a that receives it transmits ACK to the terminal 3 (s13), the SIP sequence is completed, and user traffic can be exchanged between the terminals 2a and 3. Although the edge router 1 performs no special processing for traffic from the terminal 3 to the terminal 2a (s15), it performs QoS/filtering processing for traffic from the terminal 2a to the terminal 3 (s14) according to the setting performed in p3 (p4).

Figure 2:
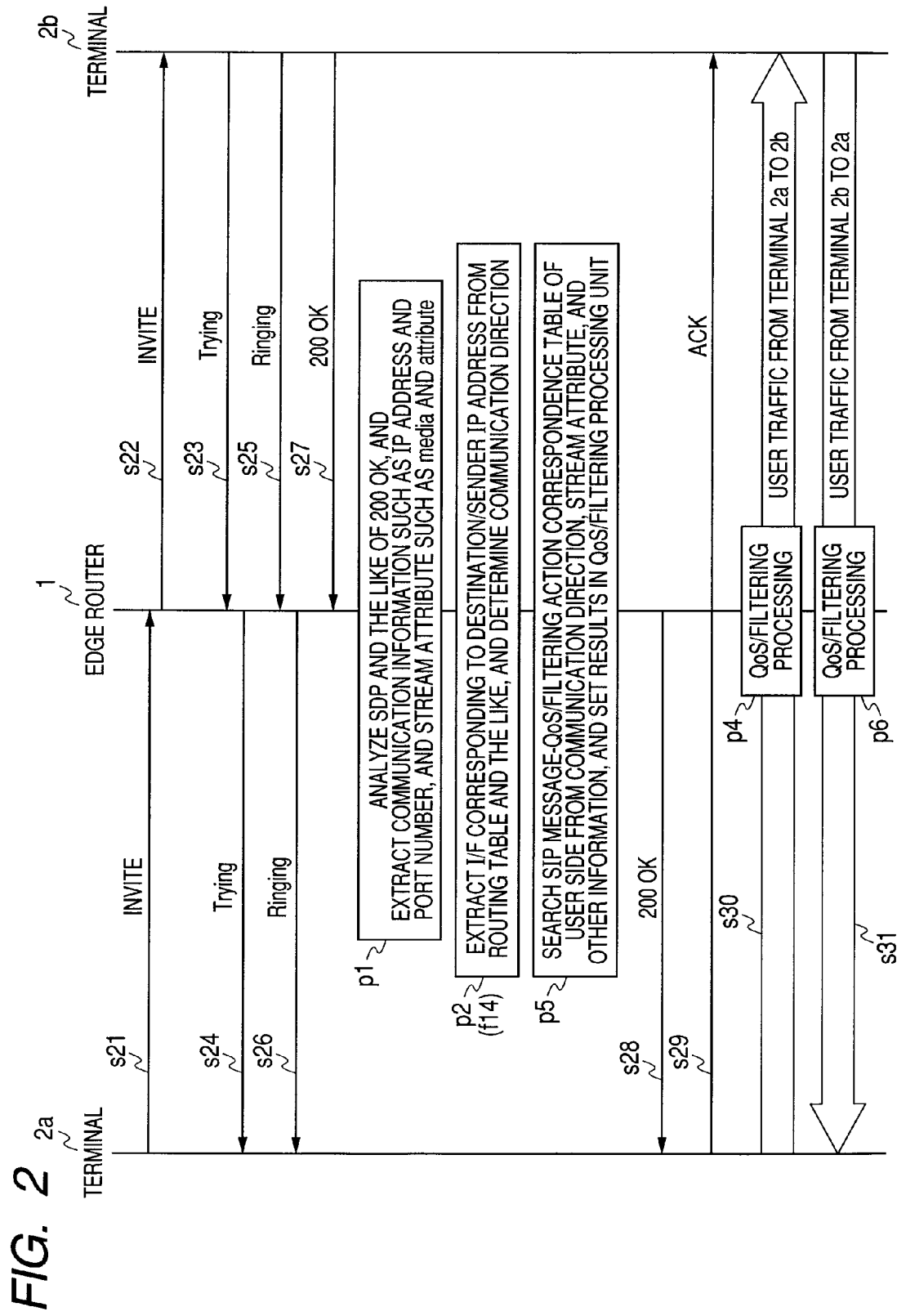
FIG. 2 is a sequence diagram of this embodiment (user network loopback)

FIG. 2 is a sequence diagram showing user network loopback to which this embodiment is applied. An SIP INVITE message issued from the terminal 2a arrives in the terminal 2b via the edge router 1 (s21, s22). The terminal 2b transmits an SIP Trying message, and then an SIP Ringing message to the terminal 2a. The two messages arrive in the terminal 2a through a route reverse to INVITE (s23, s24, s25, s26). On completion of a preparation to receive INVITE from the terminal 2a, the terminal 2b transmits a 200 OK message (s27). The 200 OK message arrives in the edge router 1.

On receiving the 200 OK message, the edge router 1 analyzes an SIP message (including SDP) of 200 OK, and extracts communication information such as IP address and port number, and stream attributes such as band, media, and attribute (p1). The edge router 1 checks the extracted destination/sender IP address and the routing table and the like to extract a corresponding interface, and determines a communication direction, based on it (p2). Since the communication direction is user network loopback (turnaround (LAN) with sender and destination in LAN: described later in f14), the edge router 1 searches the SIP message-QoS/filtering action correspondence table 1023 of user side from the stream attributes and other information, and sets results in the QoS/filtering processing unit (p5). Processing for determining a communication direction and the selection of a correspondence table to be used will be detailed in "3. QoS Setting Flowchart." After that, the edge router 1 transmits a 200 OK message to the terminal 2a (s28). The terminal 2a that receives it transmits ACK to the terminal 2b (s13), the SIP sequence is completed, and user traffic can be exchanged between the terminals 2a and 2b. For traffic from the terminal 2a to the terminal 2b (s30), and traffic from the terminal 2b to the terminal 2a (s31), QoS/filtering processing is performed according to the setting performed in p5 (p4, p6).

Figure 3:
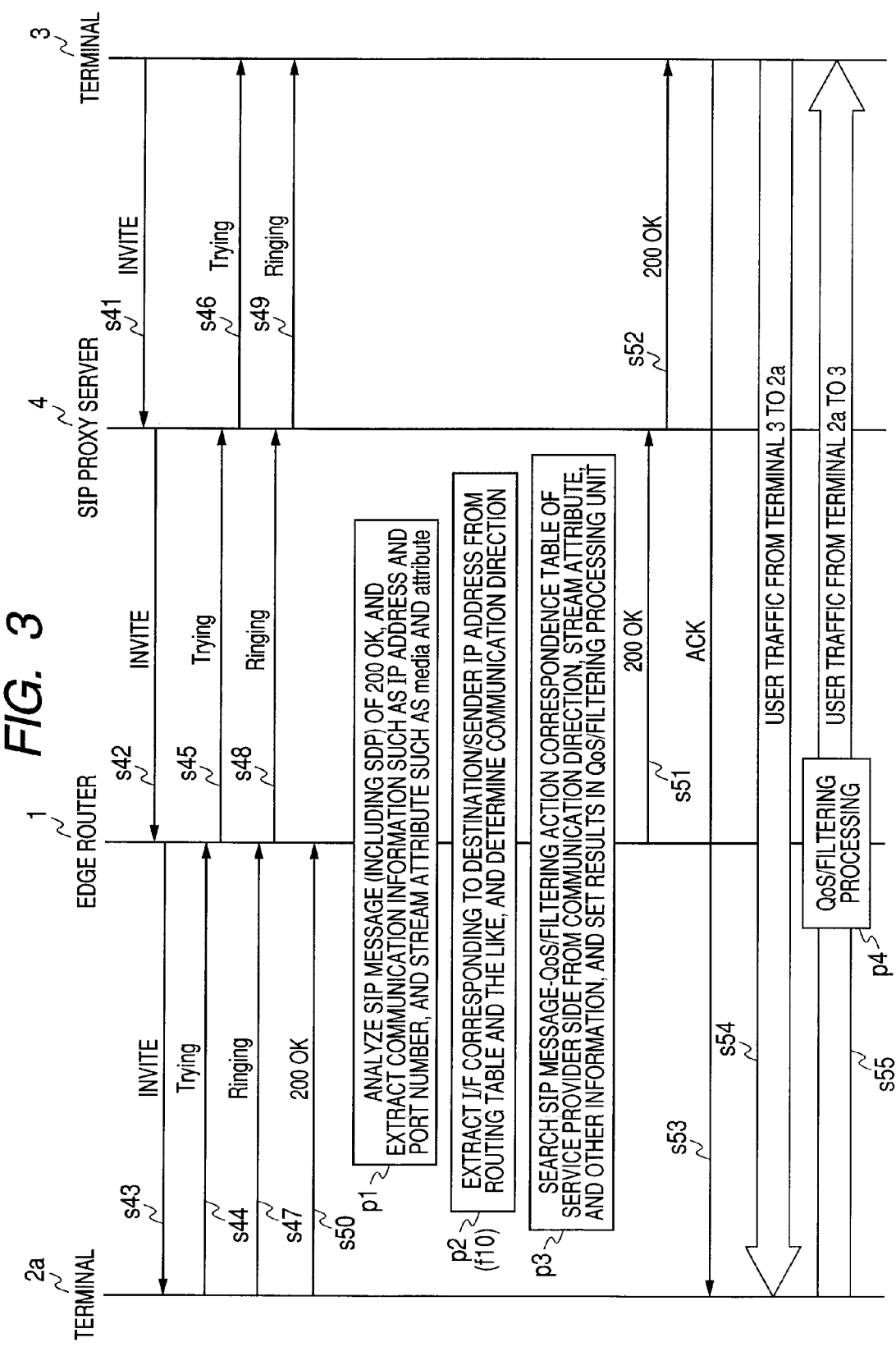
FIG. 3 is a sequence diagram of this embodiment (a call to arrive in a terminal 2a passes through an SIP network)

FIG. 3 is a sequence diagram when a call to arrive in a terminal 2a to which this embodiment is applied passes through an SIP network.

An SIP INVITE message issued from the terminal 3 is temporarily put into proxy in an SIP proxy server that provides actual services (s41), before being transferred to the edge router 1 (s42). The edge router 1 transfers an INVITE message to the terminal 2a being a transmission party (s43). The terminal 2a transmits an SIP Trying message, then an SIP Ringing message to the terminal 3. The two messages arrive in the terminal 3 through a route reverse to INVITE (s44, s45, s46, s47, s48, s49). On completion of a preparation to receive INVITE from the terminal 3, the terminal 2a transmits a 200 OK message (s50). The 200 OK message arrives in the edge router 1 via the server 4 (s11). On receiving the 200 OK message, the edge router 1 analyzes an SIP message (including SDP) of 200 OK, and extracts communications information such as IP address and port number, and stream attributes such as band, media, and attribute (p1).

The edge router 1 checks the extracted destination/sender IP address and the routing table and the like to extract a corresponding interface, and determines a communication direction, based on it (p2). Since the communication direction is a direction that passes through the SIP network (inbound direction with sender of LAN and destination of WAN: described later in f10), the edge router 1 searches the SIP message-QoS/filtering action correspondence table 1023 of service provider side from the stream attributes and other information, and sets results in the QoS/filtering processing unit (p3). Processing for determining a communication direction and the selection of a correspondence table to be used will be detailed in "3. QoS Setting Flowchart." After that, the edge router 1 transmits 200 OK to the terminal 3 via the server 4 (s52), the server 4 transfers it to the terminal 3 (s53), the terminal 3 that receives it transmits ACK to the terminal 2a, SIP sequence is completed, and user traffic can be exchanged between the terminals 2a and 3. Although the edge router 1 performs no special processing for traffic from the terminal 3 to the terminal 2 (s54), it performs QoS/filtering processing for traffic from the terminal 2a to the terminal 3 (s55) according to the setting performed in p3 (p4).

Figure 4:
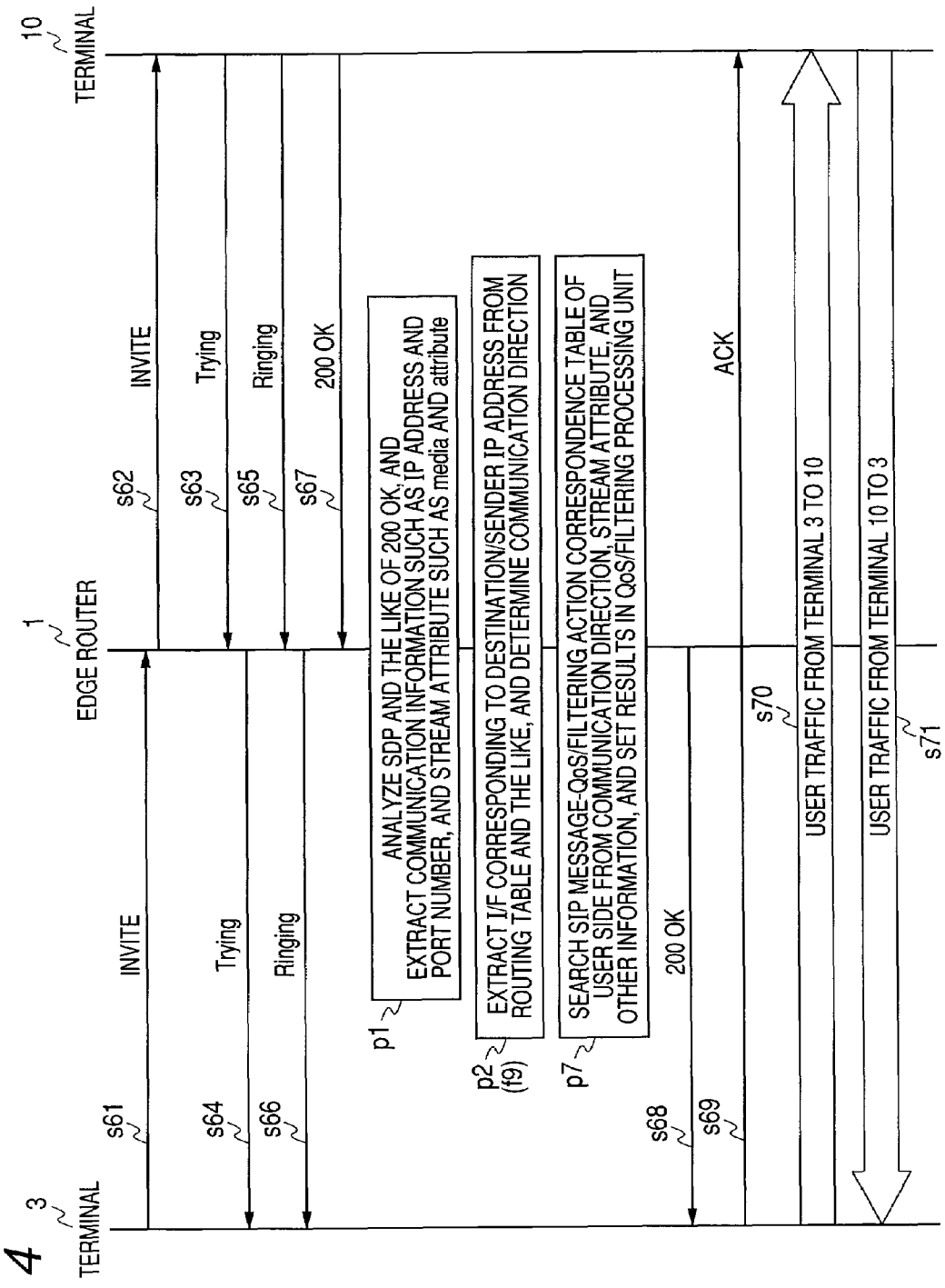
FIG. 4 is a sequence diagram of this embodiment (SIP service provider loopback)

FIG. 4 is a sequence diagram showing user network loopback to which this embodiment is applied. An SIP INVITE message issued from the terminal 3 arrives in the terminal 4 via the edge router 1 (s61, s62). The two messages arrive in the terminal 3 through a route reverse to INVITE (s63, s64, s65, s66). On completion of a preparation to receive INVITE from the terminal 3, the terminal 4 transmits a 200 OK message (s67) The 200 OK message arrives in the edge router 1. On receiving the 200 OK message, the edge router 1 analyzes an SIP message (including SDP) of 200 OK, and extracts communications information such as IP address and port number, and stream attributes such as band, media, and attribute (p1). The edge router 1 checks the extracted destination/sender IP address and the routing table and the like to extract a corresponding interface, and determines a communication direction, based on it (p2). Since the communication direction is user network loopback (turnaround (WAN) with sender and destination addresses in WAN: described later in f9), the edge router 1 searches the SIP message-QoS/filtering action correspondence table 1024 of user side from the stream attributes and other information, and sets results in the QoS/filtering processing unit (p7). However, actually, since the terminal is not the edge of session, usually setting is not performed. Processing for determining a communication direction and the selection of a correspondence table to be used will be detailed in "3. QoS Setting Flowchart." After that, the edge router 1 transmits a 200 OK message to the terminal 3 (s68). The terminal 3 that receives it transmits ACK to the terminal 4 (s69), the SIP sequence is completed, and user traffic can be exchanged between the terminals 3 and 4. For traffic from the terminal 3 to the terminal 4 (s70), and traffic from the terminal 4 to the terminal 4 (s71), QoS/filtering processing is not performed as described previously.

As has been described above, according to this embodiment, even when SIP traffic to be unitarily subjected to QoS management by an SIP network manager, and loopback traffic to be freely subjected to QoS management by users coexist, QoS processing can be appropriately performed.

3. QoS Setting Flowchart

Figure 5:
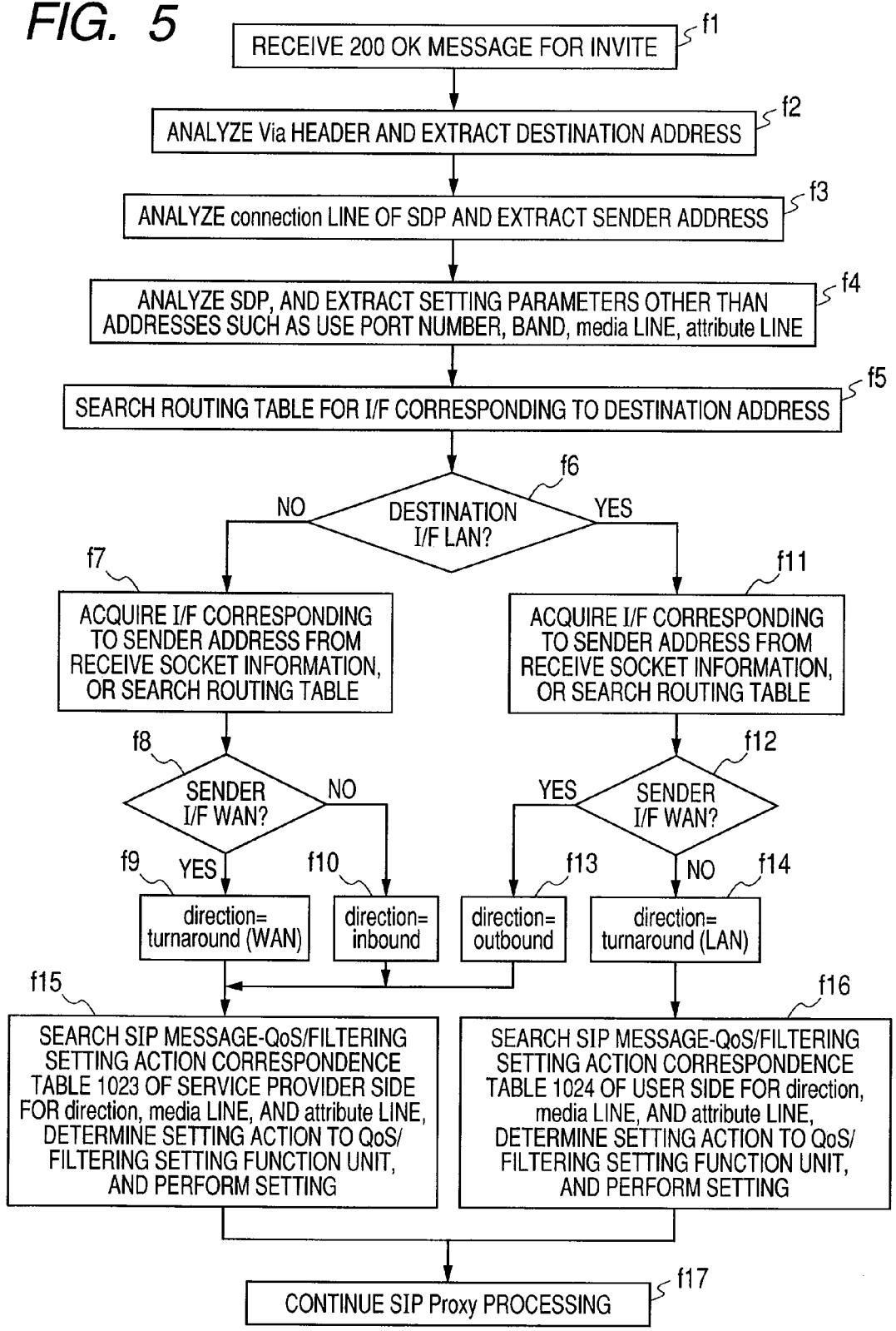
FIG. 5 is a flowchart of SIP analysis and QoS setting processing.

FIG. 5 is a flowchart showing an example of execution of the SIP analysis and QoS setting processing unit 10221. The processing of the SIP analysis and QoS setting processing unit 10221 is inserted in the middle of normal SIP proxy processing.

On receiving a 200 OK message for INVITE (f1), the SIP proxy 1022 analyzes a Via header to extract the destination address D of the message (f2), analyzes the connection line of SDP to extract a sender address (f3), and analyzes the media line, attribute line, and bandwidth line of SDP to extract other setting parameters such as media, attribute, band B, and the like (f4) The SIP analysis and QoS setting processing unit 10221 checks the destination address D against the routing table (f5) to determine whether a corresponding interface is LAN (f6).

In Step f6, when a destination interface is not LAN, the SIP analysis and QoS setting processing unit 10221 of SIP proxy 1022 uses the socket interface 10213 to check received socket information or check the sender address S against the routing table 10211, thereby extracting a corresponding interface (f7), and then determines whether the corresponding interface is WAN (f8) The SIP analysis and QoS setting processing unit 10221 sets turnaround (WAN) in a variable direction if the interface of a sender is WAN (f9), and sets inbound in the variable direction if the interface of a sender is LAN (f10). On the other hand, in Step f6, also when an interface corresponding to the destination address is LAN, the SIP analysis and QoS setting processing unit 10221 checks the received socket information or checks the sender address S against the routing table 10211 to extract a corresponding interface (f11), and determines whether an interface corresponding to the sender address S is WAN (f12). When the interface of the sender is WAN, the SIP analysis and QoS setting processing unit 10221 sets outbound in the variable direction (f13). On the other hand, when the interface of the sender is WAN, it sets turnaround (LAN) in the variable direction (f14).

When the variable direction is outbound, inbound, and turnaround (WAN), the SIP analysis and QoS setting processing unit 10221 searches the SIP message-QoS/filtering setting action correspondence table 1023 of service provider side by using the variable direction, media line, and attribute line as key, determine setting action to the QoS/filtering setting function unit 10212, and perform setting (f15). On the other hand, when the variable direction is turnaround (LAN), the SIP analysis and QoS setting processing unit 10221 searches the SIP message-QoS/filtering setting action correspondence table 1023 of user side by using the variable direction, media line, and attribute line as key, determine setting action to the QoS/filtering setting function unit 10212, and perform setting (f16). In Step f15 or f16, the setting of setting action is as described in FIG. 6. That is, the SIP analysis and QoS setting processing unit 10221, according to the setting parameter of the searched setting action, can set action (content) of QoS processing by assigning predetermined parameters such as transmission address S, destination address D, use port P, and band B t already acquired from the message. The SIP proxy 1022 continues the SIP Proxy processing (f17).

Although the above description centers on particularly embodiments of SIP, the present invention is not limited to the embodiments and can apply to different types of session control. Although the above description centers on particularly embodiments of SIP 200 OK message and IP address, the present invention is not limited to the embodiments and can apply to different types of session control messages and addresses. Furthermore, although the above description is made of embodiments in which a router is an edge router, the present invention is not limited to the embodiments and can apply to routers installed in networks other than various edges.

What is claimed is:

1. A router that includes a session control proxy function and a function to perform QoS processing for packets, and performs communication between a user network including a terminal and a session control service provider network, the router comprising:

a first QoS setting content description table that can be set by only a service provider that provides session control services, and stores the setting contents of QoS processing, correspondent to a communication direction and the stream attribute of a session control message;

a second QoS setting content description table that can be set by a service provider that provides session control services and a user network manager, and stores the setting contents of QoS processing, correspondent to a communication direction and the stream attribute of a session control message;

a QoS/filtering function unit that performs QoS processing, based on the setting content of QoS processing; and a processing unit that analyzes a session control message in the session control proxy function, refers to the first and the second QoS setting content description tables, and determines the setting content of QoS processing of the QoS/filtering function unit, wherein the processing unit extracts communication information containing a destination address and a sender address, and stream attributes from a received response message from a destination terminal, wherein the processing unit determines a communication direction according to a combination of whether a destination is in user network side or session service provider side, and whether a sender is in user network side or session service provider side, based on the extracted destination address and the sender address, and wherein the processing unit, when the communication direction of the session control message passes through the session control service provider network, refers to the first QoS setting content description table; and on the other hand, when the communication direction of the session control message is loopback from the user network side to the user side, it refers to the second QoS setting content description table, searches the setting content of QoS processing, based on the communication direction and the stream attribute, and sets the setting content in the QoS/filtering processing unit, based on the session control message containing the destination address and the sender address.

2. The router according to claim 1,
wherein the QoS/filtering function unit does not set QoS processing for traffic from a terminal of session service provider network side to a terminal of user network side, and for traffic from a terminal of user network side to a terminal of session service provider network side, performs QoS/filtering processing according to the setting contents of QoS processing.

3. The router according to claim 1,
wherein the QoS/filtering function unit, for traffic from a terminal of user network side to a terminal of user network side, performs QoS/filtering processing according to the setting contents of QoS processing.

4. The router according to claim 1,
wherein the QoS/filtering function unit does not set QoS processing for traffic from a terminal of session service provider network side to a terminal of session service provider network side.

5. The router according to claim 1,
wherein the session control message is a response message corresponding to a connection request message.

6. The router according to claim 1,
wherein the processing unit determines the setting contents of QoS processing by using elements of a media field, an attribute field, and a communication direction of stream attributes of a response message of session control messages as key to search the first or the second QoS setting content description table.

7. The router according to claim 1,
wherein the processing unit determines the setting contents of QoS processing by extracting a destination address from a Via: field and a sender address from a connection field of a response message of session control messages to analyze a communication direction of the session control messages, based on the destination address and the sender address, and using the results.

8. The router according to claim 1,
wherein the processing unit, for setting contents described in the first or the second QoS setting content description table, defines the setting contents of QoS processing, based on band information extracted from a band field of a response message of session control messages, a use port extracted from a media field of the response message, and a destination address and a sender address of the response message.

9. The router according to claim 8,
wherein the setting contents of QoS processing are obtained by performing marking with a specific priority and/or shaping in a band for a packet having a sender address, a destination address, and a use port.

10. The router according to claim 1,
wherein on receiving a response message for a connection request message of session control messages, the processing unit, by a session control proxy function, based on a session description protocol, analyzes a Via header to extract a destination address of a message, analyzes a connection field to extract a sender address of the message, and analyzes a media field, an attribute field, and a bandwidth field to extract setting parameters of media, attribute, and band,
wherein the processing unit checks a destination address against a routing table to determine whether an interface corresponding to the destination address is a user network side,
wherein the processing unit, when an interface corresponding to the destination address is not a user network side, extracts an interface corresponding to the sender address to determine whether the interface is a session service provider network side, if the sender address is in a session service provider network side, sets turnaround between session service provider networks in a variable direction indicating a communication direction, and if the sender address is in a user network side, sets inbound in the variable direction,
wherein, on the other hand, the processing unit, when an interface corresponding to the destination address is a user network side, extracts an interface corresponding to the sender address to determine whether the interface is a session service provider network side, if the sender address is in a session service provider network side, sets outbound in the variable direction, and if the sender address is in a user network side, sets turnaround between user networks in the variable direction,
wherein when the variable direction is outbound, inbound, and turnaround between session service provider networks, the processing unit uses the variable direction, the media field, and the attribute field as key to search the first service provider QoS setting content description table, determines the setting content to the QoS/filtering setting function unit, and determines the setting contents of QoS processing, based on parameters of source address, destination address, use port, and band, and
wherein, on the other hand, when the variable direction is turnaround between user networks, the processing unit uses the variable direction, media field, and attribute field as key to search the second QoS content description table, determines setting contents to the QoS/filtering setting function unit, and determines the setting contents of QoS processing, based on parameters of sender address, destination address, use port, and band.

* * * * *